US006950942B2

United States Patent
Guthery

(10) Patent No.: US 6,950,942 B2
(45) Date of Patent: *Sep. 27, 2005

(54) INTEGRATED CIRCUIT DEVICE WITH DATA MODIFYING CAPABILITIES AND RELATED METHODS

(75) Inventor: Scott B. Guthery, Newton, MA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/859,410

(22) Filed: Jun. 1, 2004

(65) Prior Publication Data

US 2004/0218436 A1 Nov. 4, 2004

Related U.S. Application Data

(63) Continuation of application No. 09/434,683, filed on Nov. 5, 1999, now Pat. No. 6,763,463.

(51) Int. Cl.$^7$ ............................................. H04L 9/32
(52) U.S. Cl. ..................................... 713/193; 713/185
(58) Field of Search ................................. 713/193, 172, 713/168, 185, 182, 176

(56) References Cited

U.S. PATENT DOCUMENTS

| 5,901,303 A | 5/1999 | Chew |
| 6,402,028 B1 | 6/2002 | Graham et al. |

*Primary Examiner*—Matthew Smithers
(74) *Attorney, Agent, or Firm*—Lee & Hayes, PLLC

(57) ABSTRACT

Various embodiment pertain to an integrated circuit (IC) device, such as smart cards, electronic wallets, PC cards, and the like, and various methods for modifying data values held by the device.

44 Claims, 8 Drawing Sheets

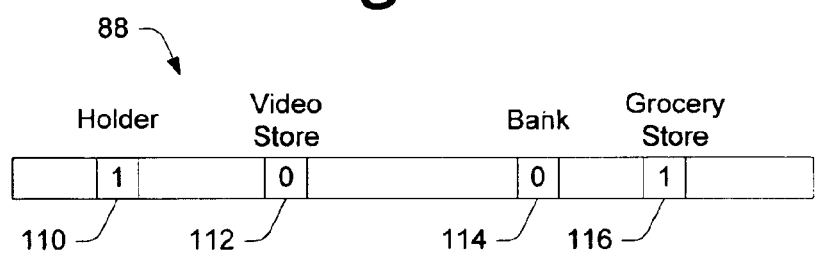
Fig. 3
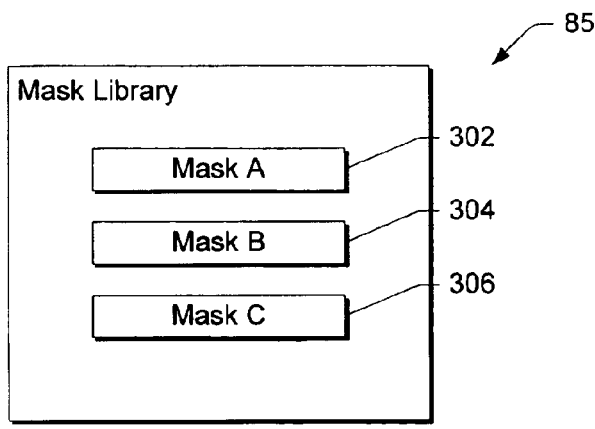
Fig. 4
Fig. 5

308

| Age | Address | Salary |
|---|---|---|
| 42 | 1079 Morewood Ave. Pittsburgh, Pa. 15201 | $50,000/Year |

| Identity | Mask |
|---|---|
| Video Store | Mask A |
| Grocery Store | Mask B |

312

| Transaction | Mask |
|---|---|
| Rent Movie | Mask A |
| Buy Alcohol | Mask B |

Fig. 7

| Transaction | Authorization Expression |
|---|---|
| Rent Movie | (Holder AND Video Store) OR (Holder AND Grocery Store) |
| Return Movie | Video Store OR Grocery Store |

# INTEGRATED CIRCUIT DEVICE WITH DATA MODIFYING CAPABILITIES AND RELATED METHODS

RELATED APPLICATION

This application is a continuation of and claims priority to U.S. patent application Ser. No. 09/434,683, filed on Nov. 5, 1999 U.S. Pat. No. 6,763,463, the disclosure of which is incorporated by reference herein.

TECHNICAL FIELD

This invention relates to integrated circuit (IC) cards, such as smart cards and related components, to limited-memory devices and/or those with limited processing capabilities, and to various methods associated with such devices, cards and components such as methods of using and producing the same.

BACKGROUND

Today, there is increasing use of "smart cards" in place of, or in addition to, conventional magnetic stripe cards. A "smart card" is a thin card about the size of a credit card, with a built-in processor that enables the card to create data in response to external stimuli. The processor is a single-wafer integrated circuit (IC) which is mounted on an otherwise plastic card. For this reason, smart cards are often referred to as one class of "integrated circuit cards" or "IC cards".

As smart card technology becomes more pervasive, it paves the way for conducting a variety of new transactions, such as electronic money, which are not available with conventional mag-stripe cards. Smart cards also open up the arena for conducting certain new "offline" transactions, which do not involve validating a card with a central authority. These offline electronic transactions are typically performed without the human intervention, such as from a sales clerk.

Smart cards are equipped with authentication capabilities used to establish the identity of an entity with which it is communicating. An identity can be an individual human being, a business, a piece of computing hardware, software code, a network node, an organizational role, or an accreditation agent. Smart cards also have authorization capabilities to control access to resources stored on the cards or elsewhere.

Smart cards typically store data as exact or specific values. For example, the age of a user is stored as a number of years, the salary of a user is stored as a dollar value, and credit of a user is stored as loyalty point precise counts. For many computations that are performed by identities outside of the smart card, these exact values are not necessary. Yet, because this is the only data that the smart card stores, it must be provided to the requesting identity. For example, to sell cigarettes to a cardholder, a merchant need only know that the cardholder is over 18 years of age. It is unnecessary for the merchant to know the exact age of the cardholder. In many instances where specific data values are not explicitly required by an identity, rendering such specific values can be undesirable. For example, an individual may wish to protect aspects of their privacy. Yet, having to provide specific data values to some requesting identities unnecessarily compromises their privacy. On the other side of the equation, requesting identities may not want to take possession of specific data values if they do not need them for their purposes. Possessing more information than is necessary could create liability for a particular identity. For example, an identity may require certain salary information for purposes of computing cardholder benefits. The benefits might be correlated with a variety of salary ranges rather than specific salary values. If a cardholder is only able to provide their specific salary value to a requesting identity, then the identity must, necessarily, come into possession of it in order to compute the benefits. Once in possession of the specific salary value, it becomes subject to compromise which, in turn, could create liability for the identity.

Accordingly, it would be desirable to provide a way of masking or modulating data relative to particular identities in accordance with the identities' data needs.

SUMMARY

Various embodiments pertain to an integrated circuit (IC) device, such as smart cards, electronic wallets, PC cards, and the like, and various methods for modifying data values held by the device.

BRIEF DESCRIPTION OF THE DRAWINGS

FIG. 3 illustrates an identity authentication table maintained in the IC device.

FIG. 4 illustrates an authentication vector maintained in the IC device.

FIG. 5 illustrates a mask library maintained in the IC device.

FIG. 6 illustrates specific data values maintained in the IC device.

FIG. 7 illustrates mask association tables maintained in the IC device.

DETAILED DESCRIPTION

Figure 1:
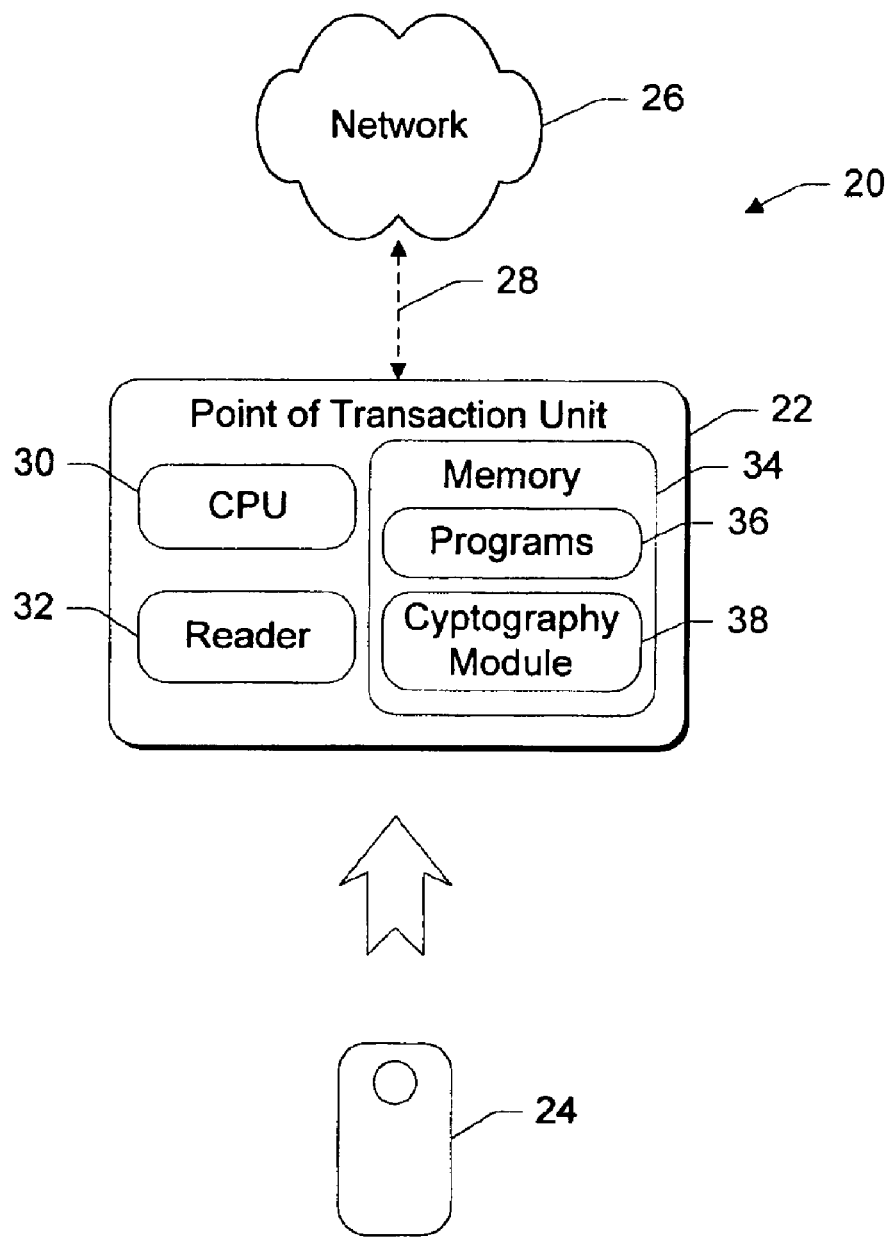
FIG. 1 is a block diagram of a point-of-transaction system used to authenticate an IC device.

FIG. 1 shows a system 20 having a point-of-transaction unit 22 and a multi-purpose integrated circuit (IC) device 24. The point-of-transaction unit 22 may be a standalone device, in which the IC device is called upon to perform offline verification. Alternatively, the point-of-transaction unit 22 may be connected to a network 26 via a cable or wireless connection represented by dashed line 28 to enable online verification or to facilitate authorization procedures initiated by the IC device. The network 26 can be a data communications network including a wire-based network, such as an enterprise network (e.g., a local area network for a business) or a public network (e.g., the Internet), and a wireless network (e.g., satellite network). The network 26 can also be implemented as a telephone network, or an interactive television network, or any other form for linking the point-of-transaction unit 22 to an external source of information.

The point-of-transaction unit 22 has a central processing unit (CPU) 30, a reader 32 to interface with the IC device 24, and memory 34. Programs 36 and a cryptography module 38 are stored in memory 34 for execution on the CPU 30.

The point-of-transaction unit 22 is representative of many different types of computerized devices that are provided for interaction with users. The point-of-transaction unit 22 may take the form of a general-purpose computer, an ATM (automated teller machine), a kiosk, a vending machine, an automated entry gate, an electronic ticket apparatus, a set top box, and the like. The point-of-transaction unit 22 controls the information transfer to and from the IC device 24.

Depending upon the configuration and operating environment of the point-11 of-transaction unit 22, one or more software applications 36 may execute on the unit. A user's home or work computer typically executes many different applications. Conversely, a computer implemented as a kiosk, ATM, or vending machine might only execute one specific application.

The IC device 26 is illustrated as a multi-purpose smart card or IC card. The multi-purpose smart card contains various resources that might be used by, or in support of, an application executing on the point-of-transaction unit 22. Among these resources are cryptography capabilities. The IC card stores public and private key pairs and can hold related data such as certificates. The IC card also performs rudimentary cryptographic functions, including encryption, decryption, signing, authentication. The IC card may also contain resources in the form of electronic assets, which represent value. For instance, the IC card might store assets in the form of electronic entertainment tickets, travel reservations, service contracts, medical prescriptions, government entitlement provisions, electronic cash, public transportation tokens, and so one. With such diverse resources, the IC card 24 is capable of supporting multiple applications in different environments.

One exemplary implementation of an architecture that facilitates multi-use IC cards is described in co-pending U.S. patent application Ser. No. 08/647,199, entitled "System And Method For Configuring And Managing Resources On A Multi-Purpose Integrated Circuit Card Using A Personal Computer", which was filed Mar. 11, 1996 in the names of Doug Barlow, Blair Dillaway, Barbara Fox, Terry Lipscomb, and Terrence Spies. This application is assigned to Microsoft Corporation and is hereby incorporated by reference.

It is noted that, in addition to the illustrated smart cards, the IC device might be embodied in other forms, such as an electronic wallet, a personal digital assistant, a smart diskette (i.e., an IC-based device having a form factor and memory drive interface to enable insertion into a floppy disk drive), a PC card (formerly PCMCIA card), and the like. Generally, the IC device 26 is characterized as an electronic device with limited processing capabilities and memory wherein large size number crunching is impractical. However, aspects of the described embodiments may be utilized with IC devices that do not meet this limitation, as well as to verification of non-computerized items, such as conventional credit cards. For purposes of continuing discussion and within the context of the illustrated implementation, the terms "IC device", "IC card", and "smart card" will be used interchangeably to reference the IC device 26.

The system 20 implements software that enables authentication of the point-of-transaction unit 22, the IC card 24, and any application running on the unit 22 and IC card 24. In addition, the system software enables authentication of the user to the IC card 24.

In one exemplary implementation, the system software includes a software application interface which executes on the point-of-transaction unit 22 to prevent possible covert attacks from malicious software applications which attempt to gain unauthorized access to resources on the IC card. The application interface implements the application and provides services which facilitate access to the resources on the IC card 24, without allowing the application itself to directly access the card-based resources. The application interface is implemented as a service layer for the operating system and is securely integrated with the operating system through mutual authentication.

During initialization, the application interface and the operating system exchange certificates containing identifications (i.e., serial numbers or the like) which are signed by a trusted certifying authority (e.g., the manufacturer). The operating system and application interface then authenticate each other using the certificates. One technique for authenticating the various components in a computer system, as well as the user, is described in U.S. Pat. No. 5,721,781, entitled "Authentication System and Method for Smart Card Transactions", which issued Feb. 24, 1998 in the name of Vinay Deo, Robert B Seidensticker, and Daniel R. Simon. This patent is assigned to Microsoft Corporation and is hereby incorporated by reference.

The application interface is preferably an application program interface with a set of functional APIs that can be called by the application to support a particular functionality requested by the application. One exemplary set of APIs are described in the above incorporated U.S. patent application Ser. No. 08/647,199.

Exemplary IC Device Implementation

Figure 2:
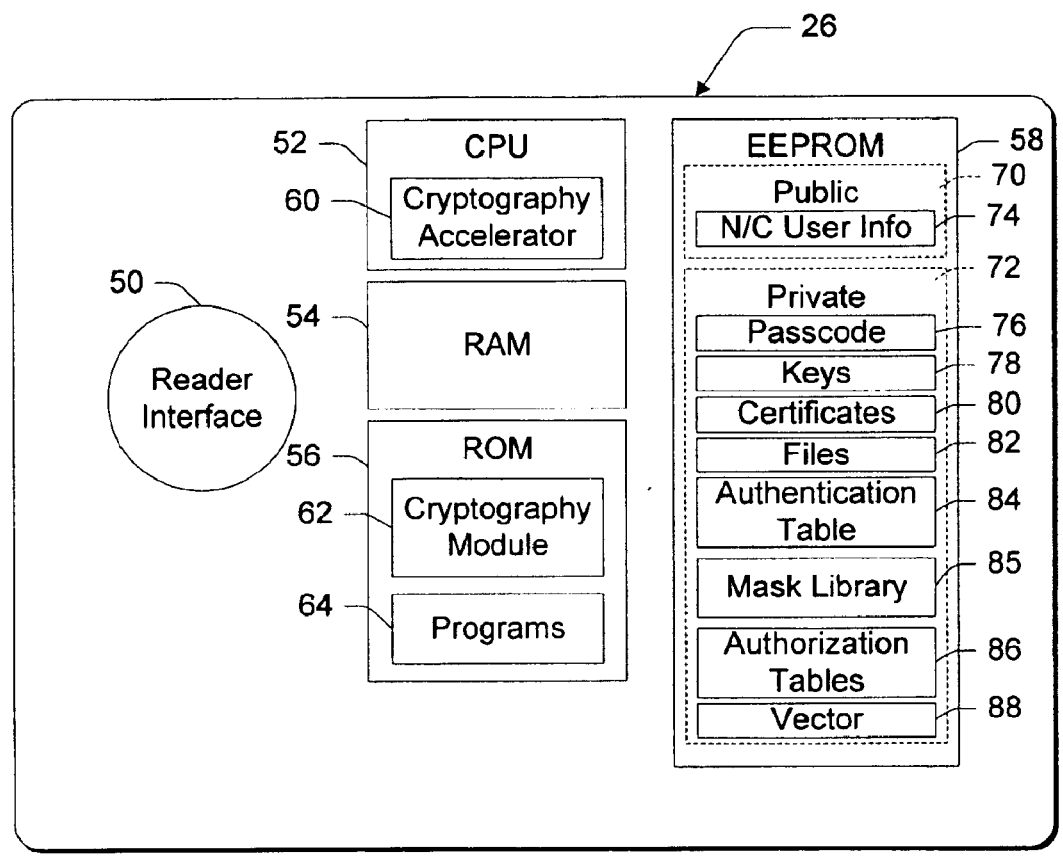
FIG. 2 is a block diagram of an IC device embodied as a smart card.

FIG. 2 shows an exemplary smart card implementation of the IC device 26. The smart card has a reader interface 50 for coupling to a card reader, a CPU or processor 52, a volatile rewritable RAM (Random Access Memory) 54, a ROM (Read Only Memory) 56, and an persistent reader/write memory such as EEPROM (Electrically Erasable Programmable ROM) 58. A multi-bit bus (not shown) connects the components.

The smart card 26 is configured with cryptography acceleration circuitry 60, shown integrated with the CPU 52, which streamlines cryptography computations to improve speed. The cryptography accelerator 60 can alternatively be implemented independently of the CPU.

The ROM 56 stores a cryptographic program 62 that executes on the CPU 52 in conjunction with the cryptography accelerator 60 to perform certain cryptographic functions, including encryption, decryption, signing, and verification. As an example, the cryptographic program 62 can encrypt and decrypt short messages using asymmetric key cryptography, such as RSA, and symmetric key cryptography, such as DES (Data Encryption Standard). The cryptographic program 62 might also be capable of generating and destroying cryptographic keys, such as symmetric keys used in the bulk encryption/decryption of a message. The symmetric keys are typically "sessional," meaning they are generated for each transaction and then subsequently destroyed.

One or more programs 64 are also stored in ROM 56. These programs are run on the CPU 52 to facilitate sessions with corresponding programs on the point-of-transaction unit 22.

The EEPROM 58 is partitioned into a public storage 70 and a private storage 72. The public storage 70 contains non-confidential user information 74, such as medical data or driver's license information. This information can be distributed freely by the smart card 24, without any special security protocol or the need for the user to enter a personal passcode.

The private storage 72 maintains information to which the user wishes to control access. The processor 52 only retrieves information from the private storage 72 upon authentication by the user and/or other entities. The user may wish to mask or generalize certain specific data values that are held in memory. This applies to whether the data values are confidential or non-confidential. One technique for authenticating the user is to require the user to enter a passcode into the point-of-transaction unit 22. The passcode is passed through the card reader 32 to the card I/O port 50, and to the card CPU 52. The CPU 52 compares the entered passcode to a passcode 76 stored in EEPROM 56, and authenticates the user if the entered and stored passcodes match.

The private storage 72 of EEPROM 58 stores cryptographic keys 78 to facilitate authentication and secure data exchange. As one example, the smart card might store two asymmetric pairs of public and private cryptography keys—a signing pair and a data exchange pair. One or more certificates 80 are also stored in the private storage 72. These certificates might contain a card ID, or user ID, public keys, and a signature of a certifying authority. One certificate might be used in a number of different applications, or alternatively, for only a specific corresponding application.

The IC card is designed to avoid exposing the private keys. The encryption keys are never directly accessible and the asymmetric private signing and exchange keys are not permitted to leave the IC card under any circumstances. In this manner, the IC card prevents a foreign application from ever inadvertently or intentionally mishandling the keys in a way that might cause them to be intercepted and compromised.

Files 82 are also stored in the private segment 72 of the EEPROM 58. These files contain data that is used by the programs during transactions. For instance, the files 82 might represent electronic assets such as tickets, tokens, e-cash, government entitlements, or a pointer to a source of value. The files might alternatively hold travel bonus awards such as air miles or hotel stays, or frequent purchase plans such as video rental or gas purchase. The files might further hold medical prescriptions and reservations.

The private segment 72 of EEPROM 58 also holds an authentication table 84, a mask library 85, one or more authorization tables 86, and an authentication vector 88. The authentication table 84 holds a list of authenticatable identities, such as people, entities, agencies, code, hardware, and so on. The mask library 85 holds one or more masks that can be used to mask user data values in accordance with the needs of a requesting identity or transaction, to name just a few. The authorization tables 86 determine authorization as a Boolean expression of authenticatable identities listed in the authentication table 84. The authorization tables 86 are associated with the files 82. The authentication vector 88 lists the identities that are currently authenticated by the card.

Identity Authentication Table

The multi-purpose smart card 24 can be used in many different ways and for many diverse environments. The smart card 24 might be used to rent a movie in one case and to withdraw money from a bank in another case. The same card might then be used to purchase groceries or to redeem flight miles.

In each environment, the smart card 24 performs various authentication procedures to verify the authenticity of the participating identity or identities. The authentication procedures may be performed using conventional techniques. For instance, the smart card might verify the user by requesting a PIN and comparing the PIN entered by the user with the passcode 76. The smart card might authenticate a grocery store or a bank by exchanging certificates and/or public keys.

The smart card 24 is designed to keep track of an arbitrary number of identities (limited only by the resources of the card). Identities do not have to be aliased or reused and data access policies can expressed directly in terms of these identities and are independent of other features of the card, such as data location.

FIG. 3 shows an identity authentication table 84 that lists the identities and correlates with them information describing how particular identities are authenticated. More particularly, the authentication table 84 has an identity field 90, a protocol field 92 for storing information describing how the identity is to be authenticated, and a data field 94 to hold the data required by the authentication protocol. The authentication table 84 also has a count field 96, which tracks the number of transactions or uses that an identity may be considered as authenticated without requiring re-authentication using the authentication protocol.

The authentication table 84 holds one or more identities, depending upon the number of uses for the smart card. Identities may be added to and removed from the card by simply altering this table.

For example, suppose the smart card 24 is configured to engage in bank transactions (e.g., withdraw, transfer, etc.), purchase groceries, and rent movies. The authentication table 84 holds four identities: a card holder 98, a video store 100, a bank 102, and a grocery store 104. The IC card 24 authenticates the card holder 98 using a PIN protocol in which the holder enters his/her passcode number. The IC card 24 authenticates the bank using a signed certificate exchange. This involves verifying the bank's certificate using the bank's public signing key. The IC card 24 authenticates the video store and grocery store by simply examining certificates passed in by these entities. A certifying authority, which can be verified by the card, signs the certificates and the card makes a judgement whether to trust the certificates passed in by the video store and grocery store. These authentication practices are common and used for example purposes. Other authentication procedures may be used.

Authentication Vector

The smart card 24 maintains an authentication vector 88 in EEPROM 58. The authentication vector 88 tracks which identities are currently authenticated by the card at any given time.

FIG. 4 shows an authentication vector 88 implemented as a bit array. The vector 88 has one or more bits assigned or associated with various identities that may be authenticated by the card. Continuing with the example identities of FIG. 3, one bit in the authentication vector 88 is associated with each identity (i.e., card holder, a video rental store, a bank, and a grocery store). FIG. 3 shows this scenario by bits 110, 112, 114, and 116.

The participants' associated bit is initially set to one binary value, such as "0". When the smart card 24 properly authenticates an identity, it resets the corresponding bit to the other binary value, such as "1". FIG. 3 shows the case in which the user and grocery store have been authenticated, as indicated by bits 110 and 116 being reset to binary value "1". The bank and video store have not been authenticated, as indicated by bits 112 and 114 being set to binary value "0".

The identity authentication table 84 and authentication vector 88 combine to track an arbitrary number of identities (limited only by the resources of the card). Identities do not have to be aliased or reused. Moreover, data access policies, as set forth in the authorization tables 86, can expressed directly in terms of the identities and are independent of other features of the card such as data location.

Mask Library

FIG. 5 shows a mask library 85 that includes a plurality of masks 302, 304, and 306. The masks are used by the IC device to modify specific data values that are held by the device into generalized representations. There can be many reasons for wanting to modify the specific data values, among which are included privacy concerns of the device user (e.g. cardholder) and liability concerns of the requesting identity. The masks enable the IC device to adapt the specific data values to different contexts in which the data is needed. Two exemplary contexts include those associated with a particular requesting identity and a particular transaction. That is, some requesting identities might not need specific data values for the computations or services that they provide. Thus, the IC device can recognize the particular data needs of a requesting identity and select a mask from mask library 85 that gives the identity just enough data for them to use. Similarly, the IC device can recognize the particular data needs of a transaction that a user might be engaged in and select a mask that gives the transaction just enough data to execute the transaction.

FIG. 6 shows a table of specific data values at 308. The table includes three fields—an age field, an address field, and a salary field. For any particular requesting identity or transaction, a user or cardholder might desire to mask one or more of these values.

Mask Association Table

FIG. 7 shows two exemplary mask association tables 310 and 312 that are stored in memory and can be used to modify specific data values. Mask association table 310 holds a number of identities and correlates those identities with associated masks. The identities may or may not be authenticatable identities. In this example, the identities include a video store and a grocery store. Mask A is associated with the video store while mask B is associated with the grocery store. When a user attempts to use the IC device with either of these entities, certain data that might be requested can be modified with the masks. Similarly, association table 312 holds a number of transactions and correlates the transactions with associated masks. In this example, two exemplary transactions are shown—a "rent movie" transaction and a "purchase alcohol" transaction. When a user attempts to rent a movie with the IC device, mask A is used. Mask A might, for example, return a generalized representation of the user's age as being "18 or over" for purpose of renting an "R" rated movie. When a user attempts to purchase alcohol with the IC device, mask B is used. Mask B might, for example, return a generalized representation of the user's age as "21 or older". Tables 310 and 312 constitute but two exemplary ways of correlating particular masks. It will be understood that other ways can be used that are within the spirit and scope of the described embodiments.

Authorization Tables

Once the card has authenticated one or more identities, it may engage in a transaction if the appropriate identities supporting the desired transaction are authenticated. The smart card 24 maintains authorization tables 86 in the EEPROM 58 that set forth whether a particular transaction can be undertaken given a set of authenticated identities. The authorization tables 86 can be stored in association with particular files 82 so that one authorization table indicates how the transaction of the associated file can be performed.

Figures 8, 9:
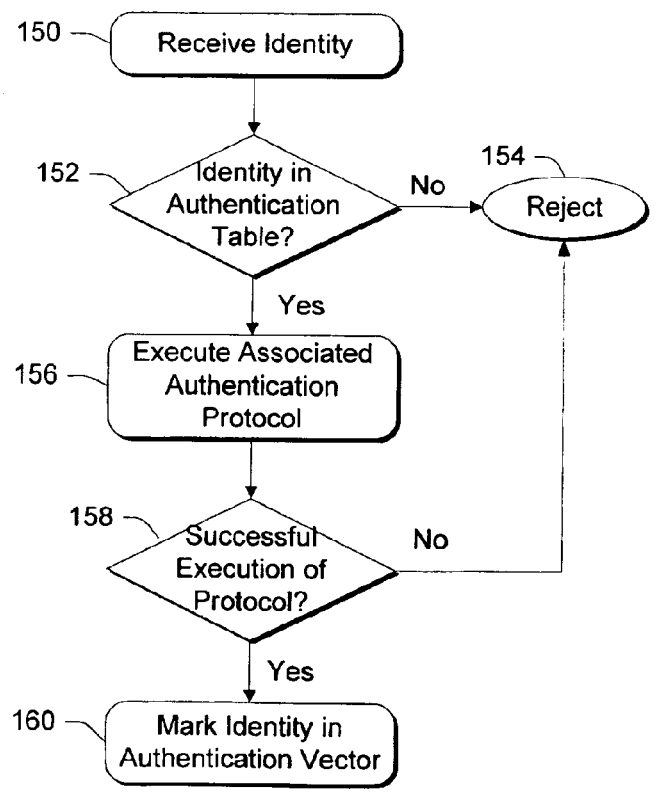
FIG. 8 illustrates an authorization table maintained in the IC device.
FIG. 9 is a flow diagram showing steps in a method for authentication an identity to the IC device.

FIG. 8 shows an authorization table 86 that is associated with a file used to facilitate renting a movie. The authorization table 86 associates movie rental transactions 120 with an authorization expression 122 represented as a Boolean function of authenticatable identities.

Suppose the movie rental file defines two transactions: a rental transaction 124 and a return transaction 126. The rental transaction 124 facilitates renting a movie, and may involve using the card to obtain a physical copy of the movie cassette or obtaining access keys, which can be stored on the card, to enable a receiver to decrypt a video stream carrying the movie. The return transaction 126 facilitates return of the movie, either the physical return of the video cassette or verifiable destruction of the decryption key. These transactions may be performed with various video rental locations, including the video store and the grocery store.

Authorization for each transaction is a function of authenticatable identities. The rental transaction 124 is permitted if the card has authenticated both the card holder and at least one of the video rental locations (i.e., the video store or the grocery store). This authorization is represented by the following Boolean expression:

Rental=(Holder AND Video Store) OR (Holder AND Grocery Store)

Requiring two authenticatable identities ensures that the party authorizing expenditure is truly the card holder, and that the party offering the video movie is truly the video store or grocery store. Absent one of these identities, the card aborts the transaction.

The return transaction 126 does not involve authenticating the identity of the holder because the card (or video owner) need not be concerned with who returned the video, only that it is returned. For instance, a relative of the card holder may use the card to return the movie or access keys to the movie. The card only needs to know if it is returning the movie to the proper place (i.e., the video store or grocery store). Accordingly, authorization for the return transaction only requires authentication of either the video store or the grocery store, as follows:

Return=Video Store OR Grocery Store

It may take an excessive amount of time and card-resident computer program code to provide for the evaluation of an arbitrary Boolean expression on a smart card. Accordingly, one preferred technique is to transform the Boolean expression into a disjunctive normal form and to store this representation of the Boolean expression on the card. A disjunctive normal form is a Boolean expression of the form:

(A AND B AND . . . ) OR (C AND D AND . . . ) OR (E AND F AND . . . ) OR . . . OR (Y AND Z AND . . . )

It is well known that any Boolean expression can be transformed into this form and that there are ways to minimize the number of terms in the resulting expressions.

Therefore, by performing some computing off the card and before the card is personalized, on card space can be saved and on card computation time minimized for the handling of arbitrary Boolean expressions.

Alternatively, a conjunctive normal form may be used as well:

(A OR B OR . . . ) AND (C OR D OR . . . ) AND (E OR F OR . . . ) AND . . . AND (Y OR Z OR . . . )

The disjunctive form is slightly favored because it would be shorter on average over the kinds of Boolean expressions that are of interest in controlling access in smart cards as compared to the conjunctive form.

Authentication and Authorization Process

FIG. 9 shows steps in a method for authenticating an identity. At step 150, the smart card 24 receives an identity (i.e., name, symbol, number, etc.). The smart card 124 determines whether the identity is listed in the identity authentication table 84 (step 152 in FIG. 9). If not, the smart card 124 rejects authentication (step 154). On the other hand, if the identity is listed (i.e., the "yes" branch from step 152), the smart card performs the authentication protocol associated with the identity (step 156 in FIG. 9).

At step 158 in FIG. 9, the smart card 124 determines whether the authentication is successful. If authentication is unsuccessful, the smart card 124 rejects authentication (step 152). However, if the authentication proves successful, the smart card 124 marks the identity as authenticated by resetting its corresponding bit in the authentication vector 88 (step 160 in FIG. 9).

Figure 10:
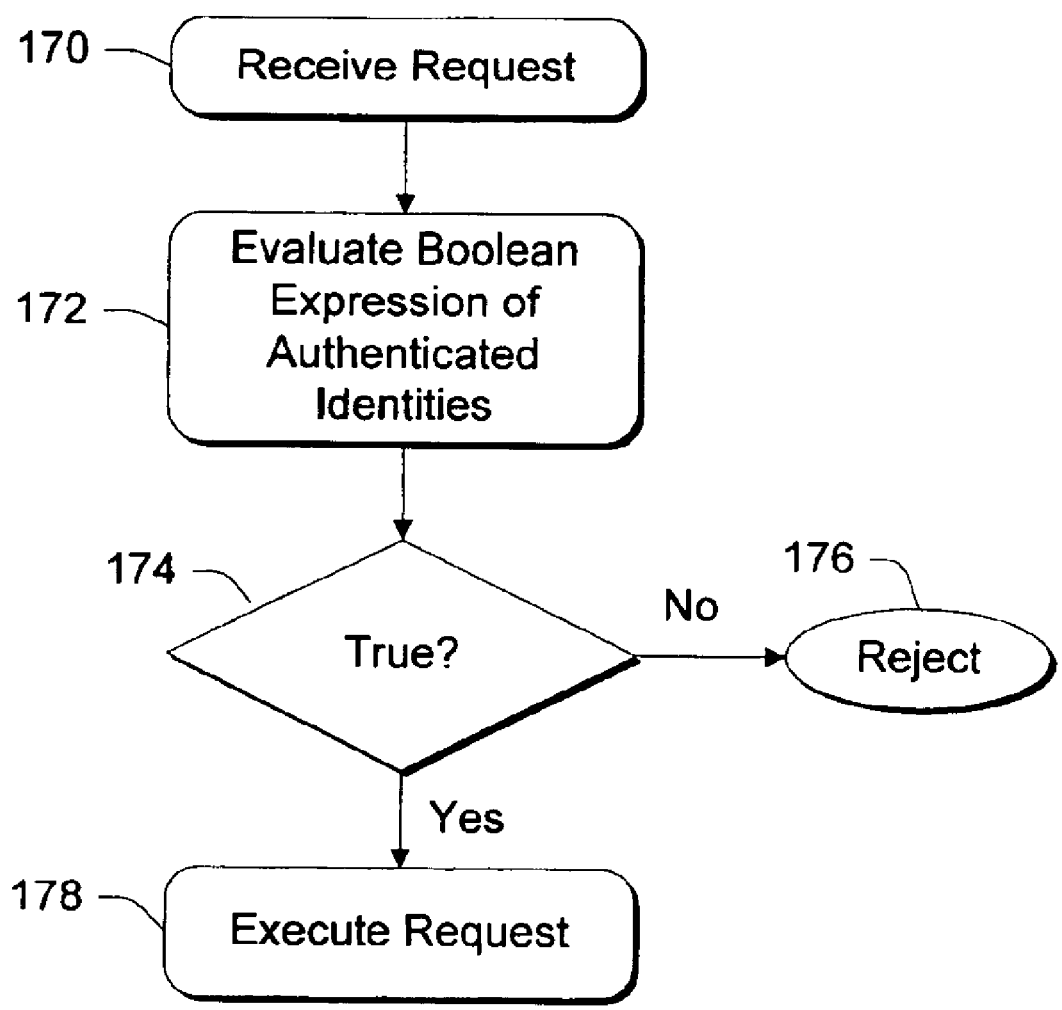
FIG. 10 is a flow diagram showing steps in a method for authorizing a particular request.

FIG. 10 shows steps in a method for authorizing a particular transaction. At step 170 in FIG. 10, the smart card receives a request for an operation, along with any identity with which the card may be involved. The card looks up the authorization table 86 associated with the requested operation (e.g., the table for authorizing movie rental), and evaluates the Boolean expression assigned for that operation given the current set of authenticatable identities referenced in the authentication vector 88 (step 172).

If the expression proves false (i.e., the "no" branch from step 174), the smart card 24 rejects the operation (step 176 in FIG. 10). On the other hand, if the expression is true (i.e., the "yes" branch from step 174), the smart card executes the operation (step 178).

Data Masking Process

Figure 11:
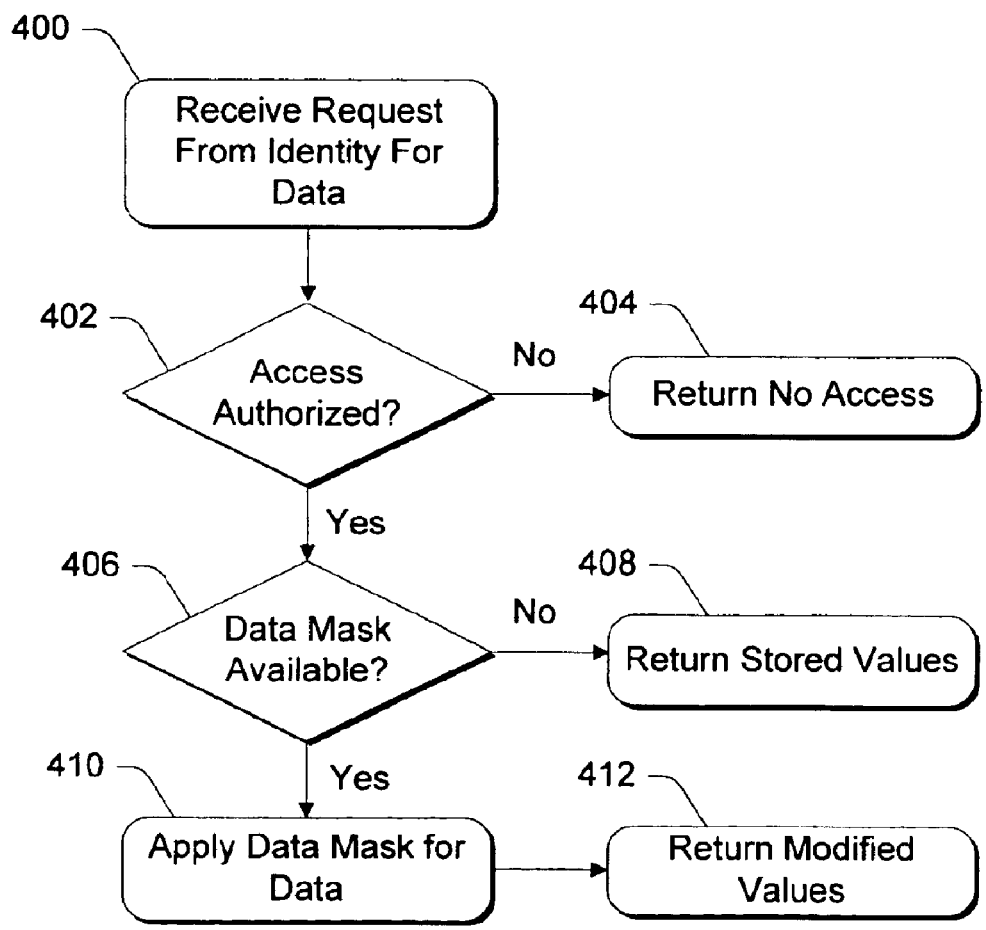
FIG. 11 is a flow diagram showing steps in a method for modifying specific data values.

FIG. 11 shows steps in a method for modifying or modulating specific data values. The method enables the smart card to retrieve and generalize specific data values that are resident on the card. At step 400, the smart card receives a request for data. The data is requested for use in certain contexts. In the examples given above and below, a "context" is associated with a particular requesting identity or a particular transaction. Other contexts are, of course, possible.

The smart card determines whether access is authorized at step 402. Access determinations can be made per identity as set forth above in connection with FIG. 10. If access is not authorized, the smart card returns a "No Access" message at step 404. If access is authorized, the smart card checks to see whether there is a data mask available at step 406. One way that the smart card can do this is to access one or more mask association tables (FIG. 7) so that it can retrieve an appropriate mask for masking the specific data values. The mask association table can contain actual masks or pointers to mask locations in the mask library (FIG. 5). It is also possible for a mask to be dynamically built. Thus, the data needs for a particular identity or transaction are ascertained by the smart card and the specific data values are tailored to meet those needs. For example, a request can pass in appropriate parameters to enable the smart card to call a procedure that dynamically builds a mask. If there is no mask available, then the smart card returns the stored specific values at step 408. If, however there is a mask available, then the smart card retrieves the specific data value (first value), applies the mask to the specific data value to provide a second, modified value at step 410, and returns the modified values to the requesting identity at step 412. The returned value is preferably less precise than the stored specific value and is provided at a level that is just enough to enable the requesting identity to complete the transaction.

The processing described just above preferably takes place within the confines of the smart card. This ensures that requesting identities are not granted access to specific data values for which there exist masks.

Figure 12:
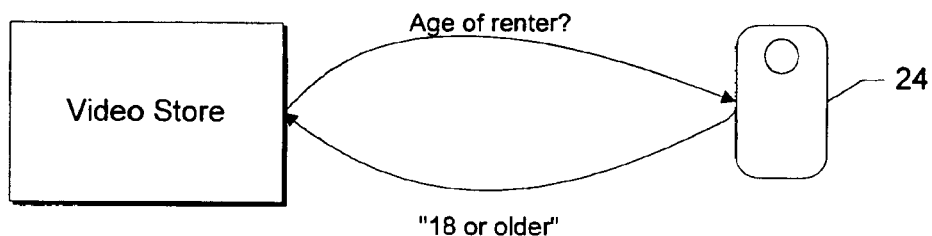
FIG. 12 illustrates one context in which data-modifying operations can take place.
Figure 13:
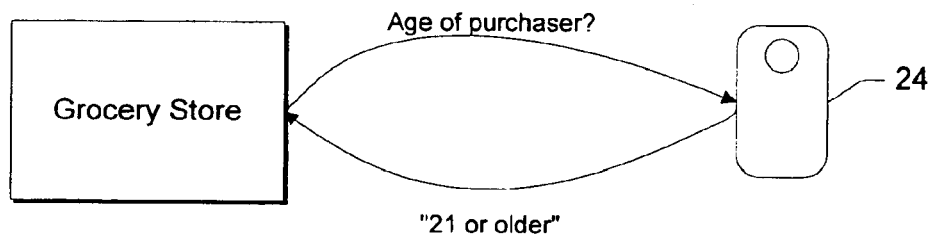
FIG. 13 illustrates one context in which data-modifying operations can take place.

As an example, consider FIGS. 12 and 13 that illustrate transactions between two different identities (i.e. the video store and the grocery store) and smart card 24. Each identity represents a different context. In addition, each identity is engaged in a transaction that itself represents a different context. Specifically, the cardholder in FIG. 12 is renting a movie from the video store, and the cardholder in FIG. 13 is purchasing alcohol from the grocery store.

In FIG. 12, the video store identity inquires the age of the renter. Age is a factor because individuals under the age of 18 are not allowed to rent "R" rated movies or perhaps senior citizens over the age of 62 are given a price discount. Smart card 24, recognizing the data needs of the video store, selects an appropriate mask from the mask library and applies it to the age data value that it holds on the card. For example, the FIG. 6 table includes the specific age data value of "42". When the smart card selects the appropriate mask and applies it to this data value, a more generalized representation of "18 or older" is returned to the video store. This tells the video store that the cardholder is old enough to rent the movie. The card might also concurrently return a more generalized representation of "NOT 62 or older" to the video store telling the video store clerk that the cardholder is not entitled to the senior citizen discount.

Similarly, when the cardholder attempts to purchase alcohol at the grocery store in FIG. 13, the smart card can recognize the data needs of the grocery store for this particular transaction and select the appropriate mask. After applying the mask to the cardholder's age data value, a more generalized representation of "21 or older" is returned to the identity. There may be instances when more than one mask is used. For example, if a cardholder attempts to rent a movie and purchase alcohol from the grocery store, then the smart card might select a mask for each specific transaction, rather than one single mask associated with the grocery store. Alternately, the smart card can recognize that there is one mask that can satisfy the data needs for both transactions, i.e. the mask the renders the "21 or older" and select that mask accordingly.

Various embodiments can provide solutions to problems associated with controlling access to user information that is embodied as specific data values that are held by an IC device. The solutions recognize that there are often times minimum data needs associated with a particular identity or transaction. The minimum data needs can be met without providing all of the data that the IC device holds that is capable of satisfying the transaction. By masking or modulating the held data dependent upon the transaction or identity, privacy concerns of device users and liability concerns of data-using identities are addressed. Other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An integrated circuit (IC) device comprising:
   means for storing a first data value; and
   means associated with said means for storing and configured to:
   retrieve the first data value from said means for storing responsive to receiving a request from an identity associated with an end-user transaction;
   modify the first data value to provide a modified data value; and
   return the modified data value to the identity.

2. The integrated circuit device of claim 1, wherein the modified data value is less precise than the first data value.

3. The integrated circuit device of claim 1 further comprising an authorization means stored in said means for storing that defines authorization for a particular transaction as a Boolean expression of authenticatable identities, and wherein the means associated with said means for storing is configured to modify the first data value only if one or more predetermined identities are authenticated.

4. The integrated circuit device of claim 1, wherein said means associated with said means for storing is further configured to ascertain data needs of a particular identity and tailor modification of the first data value to the particular identity.

5. The integrated circuit device of claim 1 embodied as a smart card.

6. The integrated circuit device of claim 5, wherein said means associated with said means for storing is configured to modify the first data value within the confines of the smart card.

7. The integrated circuit device of claim 1, wherein the first data value is not accessible to the identity.

8. The integrated circuit device of claim 1, wherein the modified data value is dependent upon the identity from which the request is received.

9. An integrated circuit (IC) device comprising:
   data storage means having a specific data value stored therein, the specific data value being useable in association with an end-user transaction;
   means for accessing said data storage means; and
   at least one mask stored in the data storage means and accessible to the means for accessing to modify the specific data value that is contained in the memory into a general representation of that data value, the general representation being useable in place of the specific data value in the end-user transaction.

10. The integrated circuit device of claim 9, wherein the at least one mask comprises a plurality of masks stored in said data at storage means, individual masks being configured to modify the specific data value to different general representations of that data value.

11. The integrated circuit device of claim 9 further comprising an authorization table stored in the data storage means that defines authorization for a particular transaction as a Boolean expression of authenticatable identities, said means for accessing being configured to modify the specific data value only if one or more identities are authenticated.

12. The integrated circuit device of claim 9, wherein the at least one mask comprises a plurality of masks stored in said data storage means, individual masks being configured to modify the specific data value into different general representations of that data value, and further comprising a mask association table stored in said data storage means to hold a number of identities and to correlate the identities with associated masks.

13. The integrated circuit device of claim 12 further comprising an authorization table stored in said data storage means that defines authorization for a particular transaction as a Boolean expression of authenticatable identities, said means for accessing being configured to modify the specific data value only if one or more identities are authenticated.

14. The integrated circuit device of claim 9, wherein the at least one mask comprises a plurality of masks stored in said data storage means, individual masks being configured to modify the specific data value into to different general representations of that data value, and further comprising a mask association table stored in said data storage means to hold a number of transactions and to correlate the transactions with associated masks.

15. The integrated circuit device of claim 9 embodied as a smart card.

16. An integrated circuit (IC) device comprising:
   data storage means for storing a specific data value;
   means for accessing said data storage means; and
   a mask library stored in said data storage means and accessible to said means for accessing, the mask library containing a plurality of masks that are useable by said means for accessing to modify the specific data value, said means for accessing being configured to use a first mask to modify the specific data value in a first context associated with an end user transaction, and to use a second different mask to modify the specific data value in a second context associated with an end-user transaction that is different from the end-user transaction associated with the first context.

17. The integrated circuit device of claim 16, wherein the contexts are associated with different authenticatable identities.

18. The integrated circuit device of claim 17 further comprising a mask association table to hold a number of authenticable identities and to correlate the authenticatable identities with associated masks.

19. The integrated circuit device of claim 16, wherein the contexts are associated wit different transactions.

20. The integrated circuit device of claim 16 further comprising an authorization table stored in said data storage means at defines authorization for a particular transaction as a Boolean expression of authenticatable identities.

21. The integrated circuit device of claim 16, wherein the contexts are associated with different authenticatable identities, said means for accessing being configured to modify the specific data value only if one or more authenticatable identities are authenticated.

22. The integrated circuit device of claim 16 further comprising an authorization table stored in said data storage means that defines authorization for a particular transaction as a Boolean expression of autheuticatable identities, wherein the contexts are associated with different authenticatable identities, said means for accessing being configured to modify the specific data value only if one or more authenticatable identities are authenticated.

23. An integrated circuit (IC) device comprising:
   means for storing data;
   processing means coupled to access said means for storing data; and a mask association table stored in said means for storing data to hold a number of identities and to correlate the identities with associated masks, the masks being usable by the processing means to modify a specific data value into a general representation of that data value, the general representation being useable in place of the specific data value in an end-user transaction.

24. The integrated circuit (IC) device of claim 23 further comprising an authentication table stored in said means for storm data that defines authorization for a particular transaction as an evaluatable expression of authenticatable identities.

25. The integrated circuit (IC) device of claim 23 further comprising a plurality of masks held in the mask association table, some of the masks being different from other of the masks.

26. The integrated circuit (IC) device of claim 23 further comprising an authentication table stored in said means for storing data that defines authorization for a particular transaction as an evaluatable expression of authenticatable identities, the processing means being configured to modify said specific data value only if one or more of the authenticatable identities are authenticated.

27. The integrated circuit (IC) device of claim 26 further comprising a plurality of masks held in the mask association table, some of the masks being different from other of the masks.

28. The integrated circuit (IC) device of claim 23 embodied as a smart card.

29. The integrated circuit (IC) device of claim 23, herein the specific data value is not accessible to at least one of the identities.

30. A storage medium comprising:
correlation means for holding a number of identities and correlating the identities with associated masks; and
code means for receiving a request for data that is stored on the storage medium and associated with an end-user transaction, retrieving a data value associated with the request, and modifying the data value into a general representation of that data value that is used in the end-user transaction.

31. The storage medium of claim 30 further comprising an authorization table that defines authorization for a particular transaction as a Boolean expression of authenticatable identities.

32. The storage medium of claim 31, wherein aid code means modifies the data value only if one or more identities are authenticated.

33. The storage medium of claim 30 further comprising a plurality of masks held in the correlation means.

34. The storage medium of claim 30 further comprising a plurality of masks held in the correlation means, at least one of the masks being different from another of the masks.

35. The storage medium of claim 30 embodied on a smart card.

36. The storage medium of claim 35, wherein said codes means modifies the data value entirely within the smart card.

37. The storage medium of claim 35, wherein the data value is not accessible to at least one identity.

38. A processor-implemented method comprising:
retrieving a specific data value that is resident on a smart card, the specific data value being retrieved responsive to an end-user transaction; and
generalizing the specific data value into a generalized value that is used in place of the specific data value in the end-user transaction, said acts of retrieving and generalizing being performed by an end-user transaction integrated circuit device.

39. The method of claim 38, wherein said retrieving takes place responsive to a request from an identity.

40. The method of claim 38, wherein said retrieving takes place responsive to a request from an identity, and further comprising returning a generalized representation of the specific data value to the identity said act of returning being performed by the end-user transaction integrated circuit device.

41. The method of claim 38, wherein said retrieving takes place responsive to a request from an authenticatable identity, and only if the authenticatable entity is authenticated, and further comprising returning a generalized representation of the specific data value to the identity said act of returning being performed by the end-user transaction integrated circuit device.

42. The method of claim 38 further comprising storing one or more masks, and wherein the generalizing of the specific data value comprises using a mask to generalize the specific data value said act of storing being performed by the end-user transaction integrated circuit device.

43. The method of claim 38 further comprising:
storing one or more masks;
associating each mask with an authenticatable identity;
receiving a request from an authenticatable identity; and
said generalizing comprising using a mask that is associated with an authenticatable identity from which a request is received to modify the specific data value.

44. The method of claim 38, wherein said generalizing comprising using a mask that is associated with an authenticatable identity from which a request is received to modify the specific data value said acts of storing, associating and receiving being performed by the end-user transaction integrated circuit device.

* * * * *